United States Patent
Fischer

[11] Patent Number: 5,821,318
[45] Date of Patent: Oct. 13, 1998

[54] HARDENER COMPOSITION FOR EPOXY RESINS

[75] Inventor: Walter Fischer, Reinach, Switzerland

[73] Assignee: Ciba Specialty Chemicals Corporation, Tarrytown, N.Y.

[21] Appl. No.: 779,181

[22] Filed: Jan. 6, 1997

Related U.S. Application Data

[63] Continuation-in-part of Ser. No. 515,755, Aug. 15, 1995, abandoned.

[30] Foreign Application Priority Data

Aug. 17, 1994 [CH] Switzerland ............ 02 537/94-0

[51] Int. Cl.[6] .................................. C08G 59/68
[52] U.S. Cl. .................. 528/93; 528/106; 528/110; 528/243; 528/422; 525/403; 525/406; 525/409; 428/413
[58] Field of Search ............... 528/422, 86, 87, 528/93, 106, 110, 243; 525/406, 403, 409; 428/413

[56] References Cited

FOREIGN PATENT DOCUMENTS

| 0554823 | 8/1993 | European Pat. Off. . |
| 0556421 | 8/1993 | European Pat. Off. . |

*Primary Examiner*—Duc Truong
*Attorney, Agent, or Firm*—David R. Crichton

[57] ABSTRACT

A composition which consists essentially of the following components:

A1) polyamines of formula (I) and/or (II)

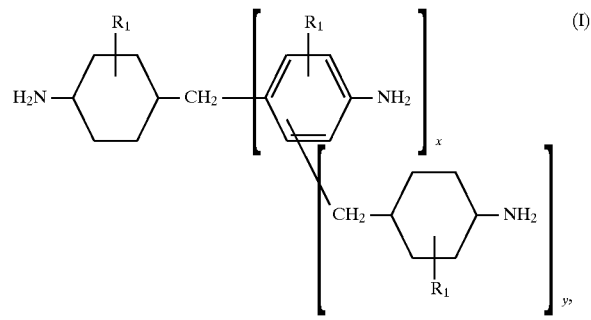

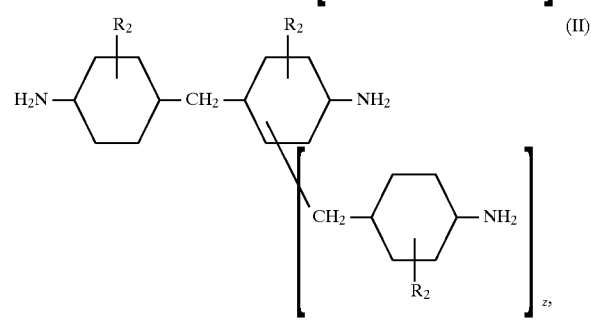

wherein $R_1$ and $R_2$ are each independently of the other a hydrogen atom or a methyl x is an integer from 1 to 3, and y is an integer from 0 to 2, the sum of x and y being up to and including 4, and z is an integer from 0 to 2; or A2) a mixture of polyamines of formula (I) and/or (II) with further polyamines; B) an aliphatic, cycloaliphatic or araliphatic alcohol or a mixture of corresponding alcohols; and C) an alkyl- and/or aralkyl-substituted monophenol or a mixture of corresponding monophenols, component C) constituting 20 to 50 percent of the total weight of the cited components. The compositions are useful as hardeners for epoxy resins to give cured material of particularly good resistance to chemicals.

13 Claims, No Drawings

HARDENER COMPOSITION FOR EPOXY RESINS

This is a continuation-in-part of application Ser. No. 08/515,755 filed Aug. 15, 1995, now abandoned.

The present invention relates to a composition based on methylene-linked cycloalkylaryl polyamines, aliphatic, cycloaliphatic or araliphatic alcohols and alkylated or aralkylated phenols, to the use of these compositions as hardeners, to an epoxy resin composition curable therewith and to the material cured accordingly.

Mixtures of polyamines having a carbon structure in the form of methylene-linked cycloalkyl and aromatic compound groups are currently being increasingly used for curing epoxy resins since, due to the toxicological risks involved, the purely aromatic polyamines frequently used hitherto, in particular 4,4'-diaminodiphenylmethane, may only be used under exceptional conditions. Mixtures of methylene-linked cycloalkylaryl polyamines and the use thereof as epoxy resin hardeners are disclosed, inter alia, in EP-A-0 554 823, and give epoxy resin coatings of generally good resistance to chemicals, with the exception of aqueous carboxylic acids, e.g. acetic acid. An aliphatic, cycloaliphatic or, preferably, araliphatic alcohol is usually added to the polyamines as viscosity depressant. According to EP-A-0 554 823 there may be additionally added to these two components of the hardener a substituted phenol as accelerator. The above-mentioned application discloses, inter alia, a hardener for epoxy resins containing 41.5% by weight of a mixture of methylene-linked cycloalkylaryl polyamines, 41.5% by weight of benzyl alcohol and 3.5% by weight of bisphenol A.

It is the object of this invention to provide a liquid epoxy resin based on methylene-linked cycloalkylaryl polyamines and aliphatic, cycloaliphatic or araliphatic alcohols having better resistance to aqueous carboxylic acids than the corresponding conventional hardener mixtures.

Accordingly, the invention relates to a composition which consists essentially of the following components:

A1) polyamines of formula (I) and/or (II)

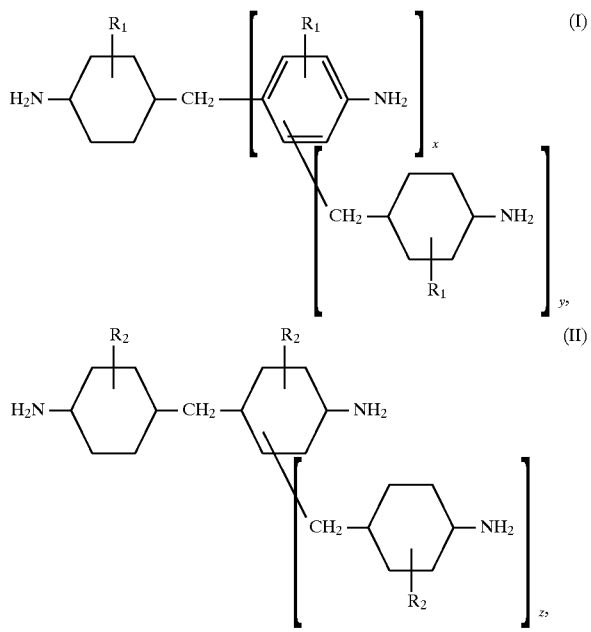

wherein $R_1$ and $R_2$ are each independently of the other a hydrogen atom or a methyl group, x is an integer from 1 to 3, and y is an integer from 0 to 2, the sum of x and y being up to and including 4, and z is an integer from 0 to 2; or A2) a mixture of polyamines of formula (I) and/or (II) with further polyamines; B) an aliphatic, cycloaliphatic or araliphatic alcohol or a mixture of corresponding alcohols; and C) an alkyl- and/or aralkyl-substituted monophenol or a mixture of corresponding monophenols, component C) constituting 20 to 50% of the total weight of the cited components.

Preferred polyamines are those of formula (I) and (II), wherein $R_1$ and $R_2$ are hydrogen. Typical examples of polyamines of formula (I) or (II) are preferably bis(4-aminocyclohexyl)methane, 2,4-bis(4-aminocyclohexylmethyl)cyclohexylamine, trimethylenetetracyclohexylamines; 4-(4'-aminobenzyl)cyclohexylamine, 2,4-bis(4-aminocyclohexylmethyl)aniline and partially hydrogenated trimethylenetetraaniline. The preparation of such polyamines is known to the person skilled in the art and may be carried out in accordance with EP-A-0 554 823 by reacting a condensate of aniline and/or o-toluidine and formaldehyde, consisting of 85 to 50% by weight of corresponding binuclear condensates and 15 to 50% by weight of corresponding tri- and polynuclear condensates, with hydrogen at a pressure of 3.5 to 27.7 MPa (500 to 4000 psig) and in the temperature range from 150° to 250° C. in the presence of a hydrogenation catalyst over 1 to 4 hours, and partially or completely isolating any undesirable components.

A preferred embodiment of the inventive compositions essentially consists of components A2), B) and C), wherein component A2) is a polyamine mixture obtainable according to this process. Such polyamine mixtures may also contain minor amounts of monoamines, typically 4-aminocyclohexyl-4-hydroxycyclohexylmethane as well as traces of a non-hydrogenated condensate of aniline and/or o-toluidine and formaldehyde, and some of these mixtures are commercially available.

EP-A-0 554 823 discloses various examples of corresponding polyamine mixtures. Particularly preferred are polyamine mixtures consisting of 20 to 40% by weight of 2,4-bis(4-aminocyclohexylmethyl)cyclohexylamine; 40 to 70% by weight of 2,4-bis(4-aminocyclohexylmethyl)aniline; 0 to 10% by weight of bis(4-aminocyclohexyl)methane and, optionally, further tetranuclear or polynuclear polyamines. In these mixtures preferably about 10 to 20%, more particularly about 14%, of all amino groups are aromatic.

In addition to the polyamine component A1) or A2), the novel compositions may contain further amines, preferably aliphatic, cycloaliphatic and/or araliphatic polyamines, typically in an amount of up to 50% by weight, based on the total amount of amines. The total amount of the polyamines A1) or A2) in the novel compositions is preferably in the range from 30–70% by weight.

Component B) is preferably added to the novel compositions in an amount of 20 to 50% by weight, based on the total weight of the polyamines as well as of components B) and C).

Component B) acts, in particular, as viscosity depressant. It is preferably a straight-chain or branched aliphatic alcohol containing 1 to 10 carbon atoms, which is liquid at room temperature, or a liquid cycloaliphatic or araliphatic alcohol containing 5 to 10 carbon atoms. The terms aliphatic, cycloaliphatic and araliphatic in this connection will be understood as embracing also the corresponding alcohols which additionally contain one or more than one hetero atom, preferably one or more than one oxygen, sulfur or nitrogen atom.

Component B) is most preferably an araliphatic alcohol, more particularly furfuryl alcohol or benzyl alcohol or a mixture thereof.

Component C) of the novel compositions comprises in particular monophenols carrying one, two or three substituents selected from alkyl groups containing 3 to 18 carbon atoms and from phenylalkyl groups. Illustrative examples of suitable alkyl groups are in particular n-propyl, isopropyl, n-butyl, sec-butyl, tert-butyl, n-amyl, sec-amyl, tert-amyl, branched and unbranched hexyl, heptyl, octyl, nonyl, dodecyl or octadecyl. The phenylaryl groups are preferably phenyl-($C_1$—$C_6$)alkyl groups. A particularly preferred example of such a phenylaryl group is that of formula.

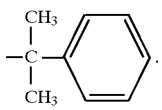

In the art, phenols carrying this substituent are often called for short "cumyl phenols". This applies also to this specification, unless otherwise stated. Individual substituents are preferably, in ortho- or para-position, substituent pairs in 2,4- or 2,6-position and substituent groups of three in 2,4,6-position to the phenolic hydroxyl group. Typical examples of suitable commercially available monophenols are 2-isopropylphenol, 2-sec-butylphenol, 4-sec-butylphenol, 2-tert-butylphenol, 4-tert-butylphenol, 2-tert-amylphenol, 4-tert-amylphenol, 4-n-octylphenol, 4-(1,1,3,3-tetra-methylbutyl)phenol (=4-tert-octylphenol), 4-nonylphenol, 4-dodecylphenol, 4-octa-decylphenol, 4-cumylphenol, 2,4-dicumylphenol, 2-tert-butyl-para-cresol, 6-tert-butyl-ortho-cresol, 4-tert-butyl-ortho-cresol, 6-tert-butyl-metacresol, 4,6-di-tert-butylphenol, 2-sec-4-tert-butylphenol, 2,4-di-tert-amylphenol, 6-tert-butyl-2,4-xylenol , 4,6-di-tert-butyl-ortho-cresol, 4-sec-2,6-di-tert-butylphenol or 2,6-di-tert-butyl-4-nonylphenol. Very particularly preferred monophenols are those carrying an alkyl substituent of 9 to 12 carbon atoms or a substituent of formula

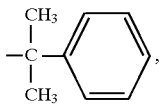

which is preferably in para-position to the hydroxyl group of the phenol, more particularly p-nonylphenol and p-dodecylphenol or mixtures of these two.

Preferably, component C) consitutes 25 to 40 percent, particularly 25 to 35, most preferably 25 to 30 percent of the total weight of the components A (that means A1 or A2), B and C.

A preferred embodiment of the novel compositions comprises components A1) or A2) in an amount of 40 to 60% by weight, preferably 45 to 55% by weight, component B) in an amount of 20 to 40% by weight, preferably 15 to 25% by weight, and component C) in an amount of 25 to 40% by weight, preferably 25 to 35% by weight, based on the total weight of components A1), B) and C), the sum of all these percentages being 100.

The novel compositions are particularly suitable as hardeners for epoxy resins. Accordingly, the invention also relates to curable compositions comprising a) at least one epoxy resin, and b) a composition, as described above, as hardener.

Epoxy resins (a) which may suitably be used in the novel curable compositions are the standard epoxy resins of epoxy resin technology containing more than one 1,2-epoxide group in the molecule. Typical examples of epoxy resins are:

I) Polyglycidyl and poly(β-methylglycidyl) esters which are obtainable by reacting a compound containing at least two carboxyl groups in the molecule and epichlorohydrin or β-methylepichlorohydrin. The reaction is conveniently carried out in the presence of a base.

Compounds containing at least two carboxyl groups in the molecule may suitably be aliphatic polycarboxylic acids. Examples of such polycarboxylic acids are oxalic acid, succinic acid, glutaric acid, adipic acid, pimelic acid, sebacic acid, suberic acid, azelaic acid or dimerised or trimerised linoleic acid. It is, however, also possible to use cycloaliphatic polycarboxylic acids such as tetrahydrophthalic acid, 4-methyltetrahydrophthalic acid, hexahydrophthalic acid, 4-methylhexahydrophthalic acid or cyclohexane-1 ,4-dicarboxylic acid. Aromatic polycarboxylic acids can also be used, typically phthalic acid, isophthalic acid and terephthalic acid.

II) Polyglycidyl or poly(β-methylglycidyl) ethers which are obtainable by reacting a compound containing at least two free alcoholic hydroxyl groups and/or phenolic hydroxyl groups and epichlorohydrin or β-methylepichlorohydrin, under alkaline conditions or in the presence of an acid catalyst and subsequent treatment with an alkali.

The glycidyl ethers of this type are typically derived from acyclic alcohols, typically from ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylol-propane, pentaerythritol, sorbitol, as well as from polyepichlorohydrins. They may also be derived from cycloaliphatic alcohols such as 1,4-cyclohexanedimethanol, bis(4-hydroxycyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)diphenylmethane.

The glycidyl ethers may also be derived from mononuclear phenols, typically from resorcinol or hydroquinone, or they are derived from polynuclear phenols such as bis(4-hydroxyphenyl)methane, 4,4'-dihydroxybiphenyl, bis (4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as from novolaks obtainable by condensation of aldehydes such as formaldehyde, acetaldehyde, chloral or furfuraldehyde, with phenols such as phenol, or with phenols which are substituted in the nucleus by chlorine atoms or $C_1$—$C_9$ alkyl groups, for example 4-chlorophenol, 2-methylphenol or 4-tert-butylphenol, or by condensation with bisphenols of the type cited above.

III) Poly(N-glycidyl) compounds obtainable by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane. The poly(N-glycidyl) compounds also include triglycidyl isocyanurate, N,N'-diglycidyl derivatives of cycloalkylene ureas such as ethylene urea or 1,3-propyleneurea, and diglycidyl derivatives of hydantoins, typically of 5,5-dimethylhydantoin.

IV) Poly(S-glycidyl) compounds, preferably bis(S-glycidyl) derivatives which are derived from dithiols such as 1,2-ethanediol or bis(4-mercaptomethylphenyl) ether.

V) Cycloaliphatic epoxy resins, including bis(2,3-epoxycyclopentyl) ether, 2,3-epoxycyclopentyl glycidyl ether, 1,2-bis(2,3-epoxycyclopentyloxy)ethane or 3,4-epoxycyclohexylmethyl-3', 4'-epoxycyclohexanecarboxylate.

However, it is also possible to use epoxy resins in which the 1,2-epoxy groups are attached to different hetero atoms or functional groups. These compounds typically comprise the N,N,O-triglycidyl derivative of 4-aminophenol, the glycidyl ether-glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use as epoxy resin (a) in the novel curable compositions a liquid or viscous polyglycidyl ether or ester, preferably a liquid or viscous diglycidyl ether of a bisphenol.

The aforementioned epoxy compounds are known and some are commercially available. Mixtures of epoxy resins can also be used.

The amount of hardener will depend on the chemical nature of the hardener and on the desired properties of the curable mixture and the hardened product. The maximum amount can be readily determined. The amount used is normally 0.75 to 1.25 equivalents of active hydrogen bound to amino nitrogen atoms per 1 epoxide equivalent.

The novel compositions can be prepared in conventional manner by mixing the components by hand stirring or using known mixing aggregates, typically stirrers, kneaders or roll mills. The compositions have only a relatively low viscosity.

Depending on the utility, the customary modifiers can be added to the compositions of this invention, including typically fillers, pigments, dyes, flow control agents or plasticisers.

The novel compositions can be cured in per se known manner in one or more steps. The cure is usually effected at room temperature or below room temperature or by heating the compositions to temperatures of up to 120° C., preferably in the temperature range from 5 to 50° C. The cure is also not aversely affected by relatively high relative humidity.

As mentioned at the outset, the moulded objects or coatings obtained from the compositions of this invention have superior resistance to chemicals, especially to carboxylic acids, for example aqueous acetic acid having a concentration of up to 30% by weight, and to highly concentrated alcohols. They constitute a further object of this invention.

EXAMPLE 1

1.75 g of Ancamine®X2168 (commercially available mixture of polyamines of formula (I) and (II)) are heated to 60° C. and 0.75 g of benzyl alcohol is added. The mixture is then cooled and, with stirring, 1.0 g of 2,6-bis-tert-butyl-4-nonylphenol is added. The mixture has a viscosity of 5100 mPa.s at 25° C.

EXAMPLES 2–6

Analogous hardener compositions are prepared with the phenols listed in the following Table and their viscosity is determined at 25° C.

| Example | Phenol | Amount [g] | Viscosity [mPa.s] |
| --- | --- | --- | --- |
| 2 | 4-nonylphenol | 1.0 | 9920 |
| 3 | 4-cumylphenol | 0.5 | 7840 |
| 4 | 2,4-dicumylphenol | 0.5 | 10610 |
| 5 | 2,4-bis-tert-amylphenol | 0.5 | 7200 |
| 6 | 2-tert-butyl-4-cumylphenol | 0.5 | 9440 |

EXAMPLE 7

3.5 g of the hardener of Example 1 are thoroughly mixed with 5.38 g of diglycidyl ether of bisphenol A having an epoxy value of 5.25–5.40 equivalents/kg and a viscosity of 10000–12000 mPa.s. After mixing and brief thermostating, the mixture has a viscosity of 6400 mPa.s. After a further 5 minutes at 25° C. the viscosity increases to 7040 mPa.s. The mixture is applied with a 0.200 mm coating knife to a glass plate and fully cured at 20° C.

EXAMPLE 8

8: 3.5 g of the hardener of Example 1 are thoroughly mixed with 5.41 g of diglycidyl ether of bisphenol A having an epoxy value of 5.25–5.40 equivalents/kg and a viscosity of 10000–12000 mPa.s. The mixture is applied with a brush to sand-blasted steel plates. Clear hard layers form after a few hours at 20° C.

If the mixture is applied with a 0.200 mm coating knife to a glass plate and cured at 20° C. for a day, the pendulum hardness according to Persoz (measured with a pendulum hardness tester supplied by BYK-CHEMIE) is 115 s. After a 7-day cure at 20° C. the Persoz hardness has increased to 284 s and after 14 days to 293 s. If curing is carried out at 5° C., the pendulum hardness after 7 days is 97 s and after 14 days 146 s. The mixture also cures satisfactorily at 20° C. and 100% relative humidity as well as at 5° C. and 45% relative humidity, with no or only very minor surface haze.

EXAMPLE 9

1.75 g of Ancamine®X2168 (commercially available mixture of polyamines of formula (I) and (II)), 0.75 g of benzyl alcohol and 1.5 g of 4-nonylphenol are thoroughly mixed with 5.41 g of diglycidyl ether of bisphenol A having an epoxy value of 5.25–5.40 equivalents/kg and a viscosity of 10000–12000 mPa.s. The mixture is applied with a brush to sand-blasted steel plates. Clear hard layers form after a few hours at 20° C.

If the mixture is applied with a 0.200 mm coating knife to a glass plate and cured for one day at 20° C., the pendulum hardness according to Persoz (measured with a pendulum hardness tester supplied by BYK-CHEMIE) is 97 s. After a 7-day cure at 20° C. the Persoz hardness increases to 246 s. If curing is carried out at 5° C., the pendulum hardness after 7 days is 91 s and after 14 days 133 s. This mixture also cures satisfactorily at 20° C. and 100% relative humidity as well as at 5° C. and 45% relative humidity, with no or only very minor surface haze.

Resistance to chemicals is determined after an 8-day cure at 20° C. as follows: Steel plates coated with the mixtures of Examples 8 and 9 are half-wetted in a clamping device with the test media and checked daily. The layers resist the chemicals for the number of days specified in the following Table without blistering or peeling from the plate.

| | Mixture of Example | |
| --- | --- | --- |
| Test medium | 8 | 9 |
| 50% $CH_3COOH/H_2O$ | 6 | 4 |
| 30% $CH_3COOH/H_2O$ | 14 | 14 |
| 10% $CH_3COOH/H_2O$ | >21 | >21 |
| 96% $C_2H_5OH$ | 12 | 4 |
| xylene | >21 | 12 |

What is claimed is:

1. A composition which consists essentially of the following components:

A1) polyamines of formula (I) or (II)

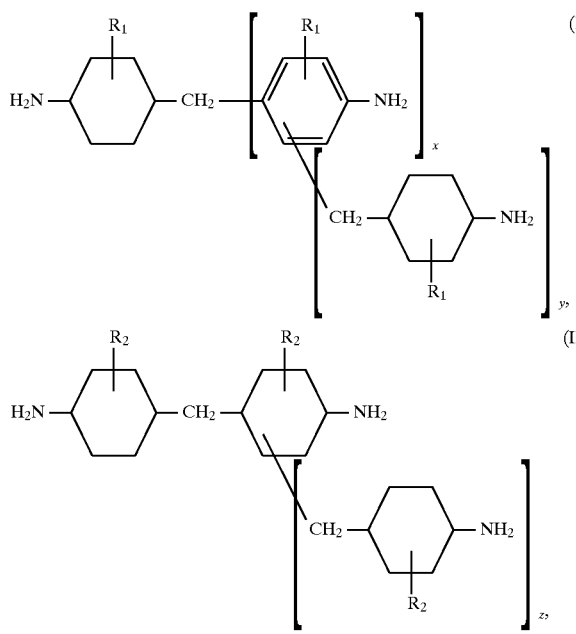

wherein $R_1$ and $R_2$ are each independently of the other a hydrogen atom or a methyl group x is an integer from 1 to 3, and y is an integer from 0 to 2, the sum of x and y being up to and including 4, and z is an integer from 0 to 2; or A2) a mixture of polyamines of formula (I) or (II) with further polyamines; B) an aliphatic, cycloaliphatic or araliphatic alcohol or a mixture of corresponding alcohols; and C) an alkyl- or aralkyl-substituted monophenol or a mixture of corresponding monophenols, component C) constituting 20 to 50 percent of the total weight of the cited components.

2. A composition according to claim 1, wherein component A1) or A2) is a polyamine mixture obtained by reacting a condensate of aniline and/or o-toluidine and formaldehyde, consisting of 85 to 50% by weight of corresponding dinuclear condensates and 15 to 50% by weight of corresponding tri- and polynuclear condensates, with hydrogen at a pressure of 3.5 to 27.7 MPa (500 to 4000 psig) and in the temperature range from 150° to 250° C. in the presence of a hydrogenation catalyst over 1 to 4 hours, and partially or completely isolating any undesirable components.

3. A composition according to claim 1, comprising as polyamines a mixture of 20 to 40% by weight of 2,4-bis(4-aminocyclohexylmethyl)cyclohexylamine; 40 to 70% by weight of 2,4-bis(4-aminocyclohexylmethyl)aniline; 0 to 10% by weight of bis(4-aminocyclohexyl)methane and, optionally, further tetranuclear or polynuclear polyamines, optionally 10 to 20% of all amino groups being aromatic.

4. A composition according to claim 1, wherein additional aliphatic, cycloaliphatic or araliphatic polyamines are admixed with the polyamine component A1) or A2).

5. A composition according to claim 1, containing the polyamines A1) or A2) in an amount of 30–70% by weight.

6. A composition according to claim 1, containing component B) in an amount of 20 to 50% by weight, based on the total weight of the polyamines as well as of components B) and C).

7. A composition according to claim 1, containing component A1) or A2) in an amount of 40 to 60% by weight, component B) in an amount of 15 to 25% by weight and component C) in an amount of 25 to 40% by weight, based on the total weight of components A1), B) and C), the sum of all these percentages being 100.

8. A composition according to claim 1, wherein component B) consists of furfuryl alcohol or benzyl alcohol or a mixture thereof.

9. A composition according to claim 1, wherein component C) consists of one or more than one monophenol, each carrying one, two or three substituents selected from alkyl groups containing 3 to 18 carbon atoms or from phenylalkyl groups.

10. A composition according to claim 9, wherein the monophenols carry an alkyl substituent of 9 to 12 carbon atoms or a substituent of formula

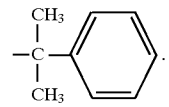

11. A composition according to claim 10, wherein the monophenol is p-nonylphenol or p-dodecylphenol or a mixture thereof.

12. A hardener for epoxy resins consisting of a composition according to claim 1.

13. A composition according to claim 10, wherein the monophenols carry an alkyl substituent of 9 to 12 carbon atoms or a substituent of formula

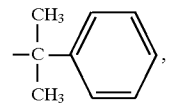

which is in para-position to the hydroxyl group of the phenol.

* * * * *